Jan. 20, 1959 D. A. MAZZARELLA 2,870,383
CONTROL FOR APPARATUS FOR TREATING SMOKESTACK
GASES AND LIKE EFFLUENTS
Filed Sept. 9, 1954 3 Sheets-Sheet 1
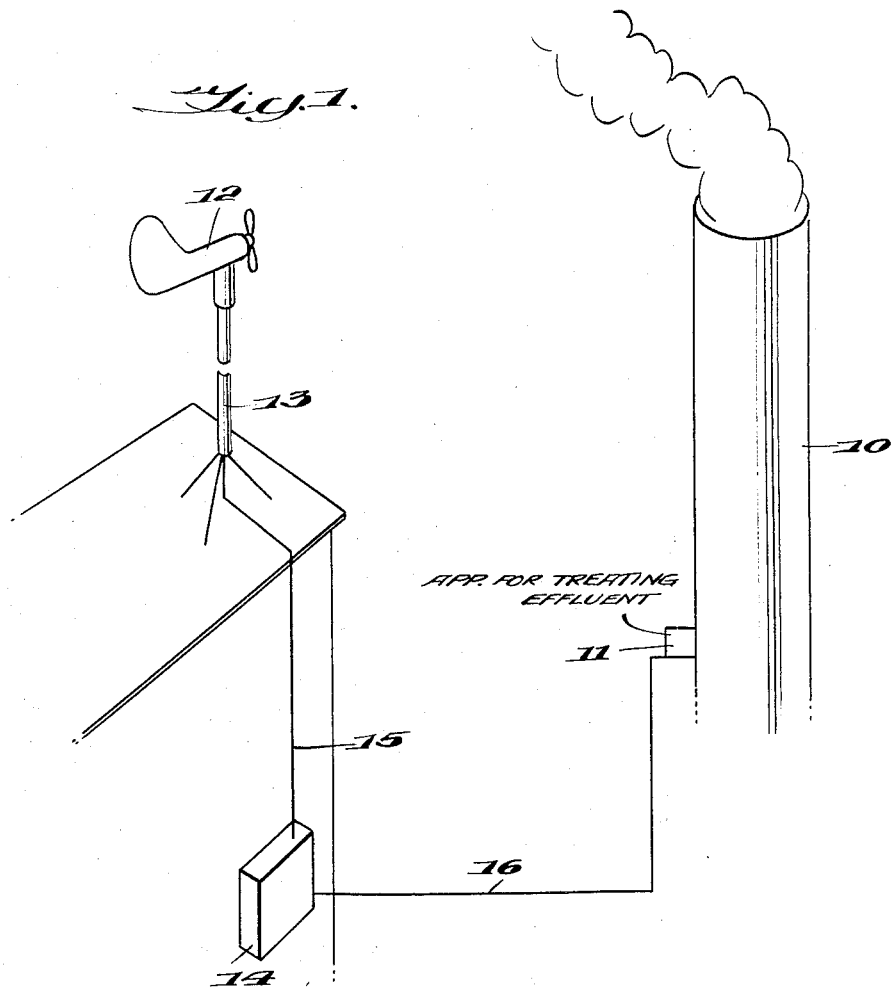
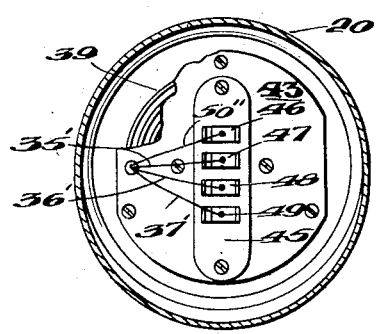
INVENTOR
DANIEL A. MAZZARELLA
BY
ATTORNEY

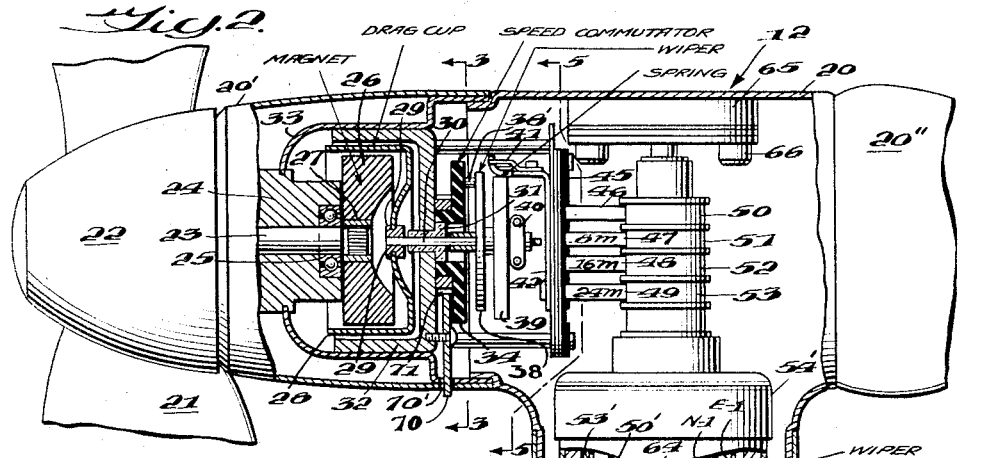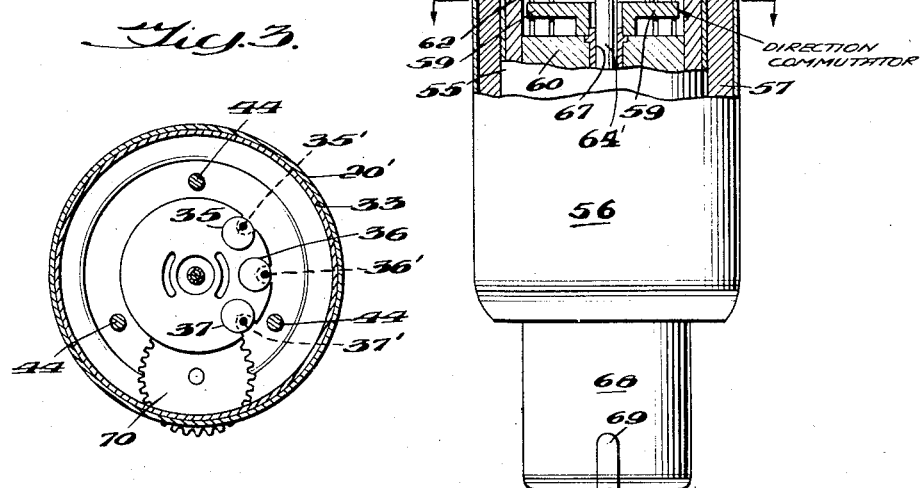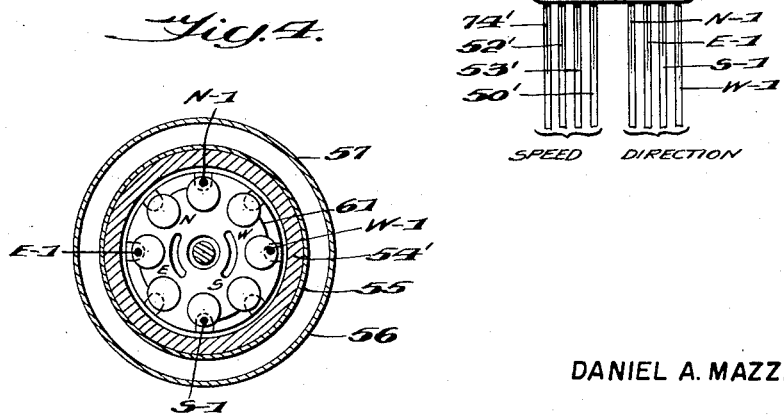

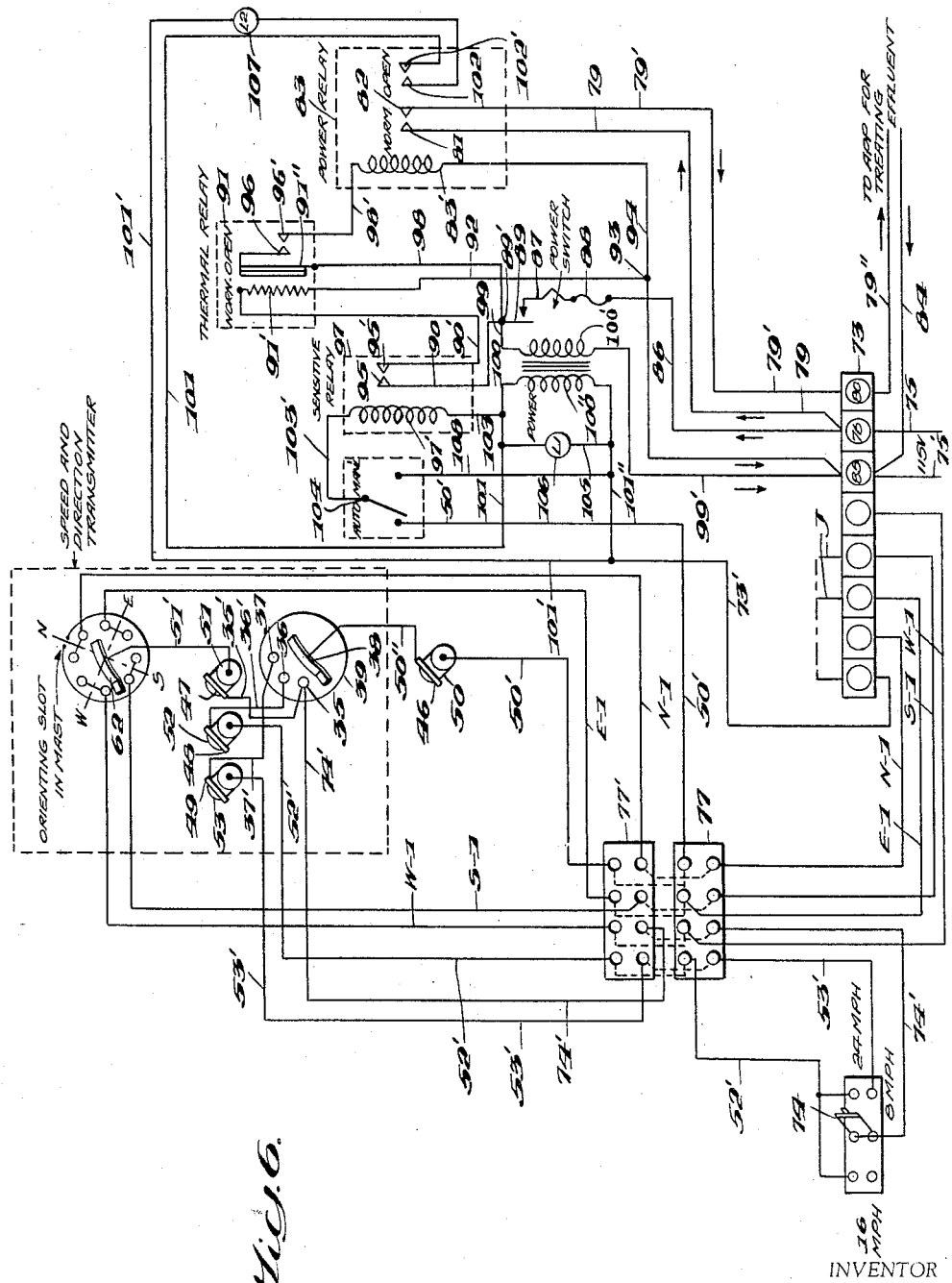

United States Patent Office 2,870,383
Patented Jan. 20, 1959

2,870,383

CONTROL FOR APPARATUS FOR TREATING SMOKESTACK GASES AND LIKE EFFLUENTS

Daniel A. Mazzarella, Towson, Md., assignor to Bendix Aviation Corporation, Baltimore, Md., a corporation of Delaware Application September 9, 1954, Serial No. 455,000

6 Claims. (Cl. 317—157)

Air pollution due to stack gases and other effluents spreading over a given territory and coming to ground within the region of an industrial plant may be controlled, or at least mitigated, by apparatus which acts to pressurize the gases and thereby increase the effective height of a stack, spray the gases with a suitable fluid or chemical to eliminate objectionable odors and contaminating matter, and otherwise treat the gases or effluent to avoid or reduce pollution of the air as the gases escape into the atmosphere. The period during which conditions are such as to cause the effluent to come to the ground within a prohibited area may be considered as an unstable regime, and the period during which conditions are such as to permit the gases to remain aloft for an indefinite distance from the plant may be considered as a stable regime. An unstable regime exists when temperature decreases with height, and this situation predominates during daylight hours. An effluent released from the stack under these conditions will come to the ground at a distance downwind proportional to the speed of the wind. A stable regime exists when temperature increases with height, and this situation predominates during the hours of darkness. An effluent released from a stack under the latter conditions will remain aloft for an indefinite distance from the plant. In both regimes the concentration of the effluent downwind is inversely proportional to the mean speed of the wind.

The primary object of the present invention is to provide an improved control which will automatically regulate a stack blower or like effluent-treating means and/or energize a suitable signal, either remote or local, as a function of wind direction and/or speed. Other and more specific objects include the provision of means whereby the control may be adjusted or preset to effect operation of effluent-treating, signaling and like apparatus only when the wind is blowing from a given general direction, as for example between north and northwest, and when the speed of the wind is at or below a given value; means for delaying action of the control to avoid hunting or unnecessary turning on and off of the apparatus when the wind is veering between selected and unselected compass areas and the speed of the wind is on the borderline of the selected value; to provide a control for effluent-treating and/or signaling apparatus which is reliable in operation and may be installed at a relatively low cost; and to generally improve and render more flexible controls of the type specified.

The foregoing and other objects and advantages will become apparent in view of the following description taken in conjunction with the drawings, wherein:

Figure 1 is a schematic view of one type of installation to which the control of the present invention is applicable;

Figure 2 is a view in sectional elevation of the transmitter housing portion of the transmitter of Figure 1;

Figures 3, 4 and 5 are sectional views taken on the lines 3—3, 4—4 and 5—5, respectively, of Fig. 2; and Figure 6 is a diagram of the electric circuitry for the improved control.

Referring to the drawings, part of an industrial plant is shown schematically in Fig. 1 and has included therein a smokestack 10, provided at its base with apparatus 11 for treating the effluent or stack gases to avoid air pollution within a prescribed area when the wind is blowing in a direction tending to carry the gases over such area and at a speed which would cause the gases to come to ground in the area. A device for indicating the direction and speed of the wind, or transmitter, is indicated at 12, said transmitter being mounted on a suitable mast 13 which, in the example illustrated, is anchored to the roof of an adjacent building. The control mechanism is located in a housing or box 14 and is connected by suitable circuitry, indicated by lines 15 and 16, with the transmitter 12 and the effluent-treating apparatus 11.

It may be assumed that there is a region within a given distance of the stack 10 throughout which the effluent from the stack is found to be objectionable or even toxic, or otherwise dangerous under unstable conditions. When the wind is blowing in a direction and at a speed such as would cause the gases to move downwardly into this region, the apparatus 11 is put in operation to treat the gases to avoid such conditions. Such treatment could be by way of pressurizing or blowing the gases higher to thereby increase the effective height of the stack, or by spraying or otherwise treating the gases. Obviously, to run the treating apparatus continuously would consume considerable power and would be unnecessary, since the wind may prevail in a given general direction at a given speed for only a relatively small part of the time. Recourse can be had to manual control, but the around-the-clock attendance of manual labor is expensive and involves the human factor, which is subject to laxity and the inability to discern when auxiliary control is required, especially during the night. The control of the present invention is designed to cause the apparatus 11 to operate only when the wind is at a given direction and at a given speed.

Referring to Fig. 2, the transmitter illustrated therein is of a preferred type of combined wind vane and anemometer, although other types may be utilized. It comprises a medial housing section 20, a nose section 20' and a tail or vane section 20", said sections being connected to form a complete hollow body having a rotor mounted on the forward end thereof, said rotor being provided with a series of impeller blades 21, here three in number, which project radially from a rotor hub 22, secured on the outer end of a shaft 23, rotatably supported by a holder bushing 24 and bearings 25. The rotor 22 drives the magnet of a magnetic drag tachometer assembly as a function of wind speed, said assembly comprising a permanent magnet 26, which in Fig. 2 appears to be annular in shape but which is of generally octagonal formation to provide a plurality of pole pieces, in this instance four in number, the magnet being provided with a hub 27 which is keyed on the inner end of shaft 23. A drag cup 28 is mounted for rotation in the magnetic field surrounding the magnet 26, the said cup having a hub 29, which is secured on the adjacent end of a shaft 30, rotatably mounted in a bushing 31, fixed in the central or axial portion of a cup-shaped support and shield 32, which in turn is fixed in a housing section 33. A commutator plate 34, of insulating material, has embedded in the active surface thereof a plurality of conductor segments, in this instance three in number and indicated at 35, 36 and 37, note Fig. 3, said commutator plate having a hub which is mounted for angular adjustment on the bushing 31, for a purpose hereinafter explained. A wiper arm 38 is secured on the inner end of the shaft 30 for rotation therewith and is provided with a contact member 38', adapted to wipe the segments 35, 36 and 37 at predetermined angular positions of the shaft 30 and hence the drag cup 28. The wires or conductors indicated at 35', 36' and 37' connect the segments 35, 36 and 37 into the electrical control circuitry of Fig. 6 in a manner to be described.

The turning or angular movement of the shaft 30 and drag cup 28 is restrained by a suitably calibrated helical spring 39, which also tends to return the wiper arm 38 to a predetermined angular position when the transmitter rotor is at a null speed. The spring 39 is secured at its inner end to the shaft 30 by means of a clamp bracket 40, and at its outer end is connected by a clamp bracket 41 to a plate 42, which in turn is connected to a brush-assembly-supporting plate 43, anchored by means of posts 44 to the member 32. A brush holder in the form of an insulating strip 45 is secured to the outer side of plate 43, and fixed to said strip 45 are a plurality of spring contact strips or brushes 46, 47, 48 and 49, adapted to engage annular conducting segments or collector rings 50, 51, 52 and 53 of a commutator 54, which projects vertically into the housing 20 and terminates at its lower extremity in an enlarged depending skirt section 54' which is telescoped in and secured to a housing member or shell 55. The housing section 20 is provided with a lower annular flange which is telescoped into the upper open end of a vertically-extending housing section 56; and between the latter and the shell 55 is a bushing 57.

A direction commutator assembly is mounted within the depending skirt portion 54' of the commutator 54; it includes a commutator plate 59, having a hub portion fixed to a supporting member 60, which in turn is fixed to said skirt. The commutator plate 59 has embedded in the active surface thereof a series of conductor segments, indicated at N, E, S and W, and which represent compass points north, east, south and west, respectively. In the present instance, these contacts are arranged in pairs with each pair connected by a jumper as at 61. This arrangement is adopted in cases where it is desired to energize the control circuit when the wind blows from a general direction or veers through an arc including a plurality of compass points. Obviously, if it is desired to sense the wind direction more accurately, or within a more limited arc, the jumpers would be omitted.

A wiper arm is indicated at 62; it is provided on its under surface with a contact member 63 and is secured on the lower end of a shaft 64, which projects upwardly through the hollow commutator 54 and at its upper end is fixed to a bracket assembly 65, made up of an upper plate anchored as by welding to the adjacent housing section 20, an intermediate shim plate and a lower plate connected to the anchor plate by screw bolts 66, the upper end of said shaft being welded to said lower plate. In this manner, the shaft 64, and hence the wiper arm 62 is caused to rotate with the transmitter housing as the latter veers in following the direction of the wind. The lower end of the shaft 64 is reduced in diameter, as at 64', and has bearing in a bushing 67.

The inner shell 55 is also reduced in diameter at its lower extremity to provide a mast connector 68, the latter having a key slot 69, by means of which it may be removably fixed on the upper end of the mast 13 of Fig. 1. When so mounted, the inner shell 55 and the commutator assembly carried thereby are held against rotation and in conjunction with the mast connector 68 provide a pivotal support for the transmitter. As the transmitter rotates about the pivotal support thus provided, it also rotates the shaft 64 and wiper 62.

A speed range adjuster in the form of a disc gear 70 is pivotally anchored to the hub plate shield and support 32 and projects through a slot 70' formed in the adjacent portion of the housing sections 33 and 20' so as to be accessible to an operator, said gear meshing with a ring gear 71 secured on the hub of the commutator plate 34. By this means the commutator plate may be selectively advanced or retarded to in turn advance or retard the point at which the wiper arm contact 38' engages any one of the segments 35, 36 or 37. In the arrangement shown, the effective contact area of the contact 38' is such as to span the insulated areas between the respective segments so that it will engage a succeeding segment prior to clearing the preceding segment. Thus the commutator plate 34 may be adjusted to cause the control apparatus to become energized at any selected speed and to remain energized over a range of higher speeds, or it may become energized from zero to a selected speed and automatically cut off beyond such speed, depending upon the arrangement of the contact segments 35, 36 and 37 and the setting of a selector switch 74, to be described. While only three contact segments are shown, it will be obvious that the number, effective area and contour of the segments is a matter of choice, to be governed by the conditions encountered.

The wiring connections to the collector rings of the speed commutator 54 and the wind direction commutator plate 59 are shown in Fig. 6; also note the conductors projecting below the hollow mast connector 68 in Fig. 2. Wire 50' may be considered as an input lead and is connected across male and female connectors 77, 77' to the collector ring 50, from which current is conducted to the wiper arm 38 by way of the brush 46, wire 50'' and coil spring 39 (not shown in Fig. 6), the latter serving both as a restraining spring and a conductor. Should the contact member 38' of the wiper arm 38 be resting on the 8-mile contact 35 of the commutator plate 34, then a circuit will be completed to the collector ring 51 by way of wire 35' and brush 47, ring 51 being connected to the wiper arm 62 by wire 51', note Fig. 6. For example, should it be desired to energize the control circuit (assuming the wind is in a given or selected direction), over a speed range of zero to eight miles per hour, then the commutator plate 34 would be angularly adjusted or preset to a point where the contact 38' rests on the starting edge of the segment 35 when the drag cup 28 is in its null position, said segment having an effective area commensurate with such range. The 16-mile segment 36 is connected to the collector ring 52 by way of wire 36' and brush 48, and said latter ring is connected to a selector switch 74, across female and male connectors 77', 77 by way of line wire 52' and from this switch the circuit is completed across male and female connectors 77, 77' back to the 8-mile segment 35 by way of line 74'; and the 24-mile segment 37 is connected to the collector ring 53 by way of wire 37' and brush 49, the ring 53 being connected across female and male connectors 77', 77 by way of line 53' with said control switch 74, from which it also connects with the 8-mile conductor 51' across said male and female connectors by way of line 74'.

The wind direction segments N, E, S and W of the commutator plate 59 are connected by wires or conductors N-1, E-1, S-1 and W-1 with terminal board or panel 73. In the arrangement shown, the conductors E-1 and S-1 are connected across their terminals by jumpers J (which could be replaced by switch means, if desired) so that should the wind be blowing throughout a range or arc extending generally through south and east, and at a given or selected speed, the control circuit would be energized in a manner to be explained, the said jumpers connecting the conductors S-1 and E-1 with the effluent-treating apparatus power circuit by way of line 73'.

Referring now to the power control circuit portion of Fig. 6, the power line input and return connections are indicated at 75 and 75'; they are wired to terminals 76 and 85. The power line to the apparatus 11 for treating the effluent, starting with terminal 76, is by way of wires or conductors 79 and 79', terminal 80 and conductor 79''; and this line has interposed therein a pair of normally open relay contacts 81 and 82, which are closed upon energization of a relay coil 83' of a power relay, indicated at 83. The return side of the effluent-treating apparatus power circuit is by way of conductor 84, which is wired to common return terminal 85.

Leading off from the terminal 76 is another supply line 86, which connects with a power switch 87 and has a protective fuse 88 therein. A conductor 89 connects switch 87 with terminal 89', and from this terminal line wire 90, 90' leads to the heater winding 91' of a thermal time delay relay 91. Winding 91' is connected to the common return terminal 85 by way of wire 92, terminal 93 and wire 94. Interposed in line 90, 90' are a pair of normally-open relay contacts 95 and 95', which are closed through energization of the relay coil 97' of a sensitive relay 97.

The thermal relay 91 may be of any preferred type obtainable in the open market; it may include a metallic element schematically indicated at 91" which when heated by current passing through the winding 91' expands and moves contact 96 into engagement with contact 96'. When these contacts close a circuit is completed to the power relay coil 83' by way of line wires 98 and 98'.

Also branching off from terminal 89' is a conductor 99, which supplies current to the primary coil 100' of a power transformer 100, said coil being connected to the return terminal 85 by line wire or conductor 99'. The secondary coil 100" of the transformer 100 is connected across a signal sircuit provided by line 101 and 101', 101", and this line has interposed therein a pair of normally-open relay contacts 102 and 102', which are also controlled by the power relay 83. The relay coil 97' of the relay 97 is connected in a line 103, 103', which in turn connects with the terminal of a manual control switch 104. A conductor 105, having a signal light 106 therein, is connected in shunt with secondary coil 100" across line wires 101" and 101. Another signal light 107 is shown as connected in the signal circuit 101, 101'. Obviously, this circuit may extend to any remote point or points and have any desired number of audible and/or visual signals therein.

It will be seen that when the power switch 87 is closed, current will flow through the primary 100' of the power transformer 100; however, no current will flow through the secondary 100" until the contacts 102, 102' are closed. Contacts 102, 102' are controlled by the power relay 83, which in turn is controlled by the thermal delay relay 91, and the latter in its turn is controlled by relay 97, the coil 97' of which may be energized either manually by moving switch 104 to its manual position, or automatically by closing of the transmitter circuit when the wind is at a given speed and direction, assuming switch 104 is then in its automatic position.

Operation

In the particular arrangement selected to illustrate the invention in the drawings, the power circuit to the effluent-treating apparatus 11 will be closed when the wind is blowing at speeds of from zero to eight miles per hour and in a direction veering anywhere through an arc covering compass points east-northeast and south-southwest, the lines from the north and west commutator segments being dead due to the fact that they are not connected by jumpers J with the line 73' at the panel board 73. During this range of speeds, the wiper contact 38' of the wiper 38 will ride on the segment 35 of the commutator plate 34, and the wiper contact 63 of the wiper 62 will ride on any one of direction segments S and E of commutator plate 59; and assuming the switch 104 is in automatic position and switch 74 is in disengaged position as shown, then a circuit will be completed across the secondary 100" of the power transformer 100 by way of line 50', collector ring 50, brush 46, wire 50", wiper 38, wire 35', brush 47, collector ring 51, wire 51', wiper 62, and either wires E-1 or S-1 to line 73', and thence by way of wire 101', shunt conductor 105, wire 103, relay coil 97' and wire 103' back to the switch 104.

Upon closing of the secondary shunt circuit, sufficient current will flow in relay coil 97' of relay 97 to energize said coil and cause contacts 95, 95' to close, whereupon the circuit to the thermal delay relay winding 91 is closed. After a predetermined interval of time, depending upon the time constant of the said relay 91, contacts 96, 96' are closed, thereby energizing relay coil 83' of power relay 83. When this happens, both sets of contacts 81, 82 and 102, 102' are closed. Closing of contacts 102, 102' energizes the signal circuit 101, 101', and closing of the contacts 81, 82 closes the circuit 79, 79', 79" to the apparatus 11 for treating the effluent whereupon the latter is placed in operation and continues to operate as long ts the wind remains within the selected speed range and direction.

In order to cover a speed range of from zero to sixteen miles per hour, the switch 74 is thrown to the left to connect the line wire 52' with the line wire 74'. Should the wind then increase beyond the 8-mile range, wiper arm contact 38' will engage speed segment 36 and a circuit will be completed from line 50' (again assuming switch 104 is turned to automatic) by way of collector ring 50, brush 46, line wire 50", wiper arm 38, wire 36', brush 48, collector ring 52, wire 52', across female and male connectors 77', 77 continuing through line 52' to switch 74, thence by way of line 74' across male and female connectors 77 and 77' and continuing on through line 74' to the 8-mile segment 35. From the latter segment the circuit is completed as above noted, i. e. by way of wire 35', brush 47, collector ring 51, wire 51', wiper 62, across any one of the commutator segments S or E and by way of lines E-1 or S-1 to the panel board 73 and across the latter to line 73', shunt conductor 105, wire 103 and relay coil 97' to switch 104, whereupon the apparatus control and signal circuits are again energized in the manner previously described.

If it is desired to cover a speed range of from zero to 24 miles per hour, the switch 74 is thrown to the right to connect both lines 52' and 53' with line 74'. Should the wind now increase beyond the 16-mile per hour range, wiper arm contact 38' will engage commutator segment 37, whereupon a circuit will be completed from switch 104 by way of line 50', collector ring 50, brush 46, wire 50", wiper 38, segment 37, wire 37', brush 49, collector ring 53, line 53' across female and male connectors 77' and 77 and continuing on through line 53' to and across switch 74, and thence by way of line 74' to the 8-mile per hour segment 35; and from this segment the circuit is completed across the shunt conductor and relay coil 97' back to switch 104 as just described in connection with the 8- and 16-mile speed ranges.

It will thus be seen that any desired direction may be chosen by selectively connecting the line wires N-1, E-1, S-1 and W-1 to the line wire 73' at the panel board 73, and the range of speed may be selected by means of the switch 74.

The thermal relay 91 functions to delay closing of the power circuit to the effluent-treating apparatus when the wind is veering on the borderline between selected and unselected directions, and also when it is blowing in gusts at speeds on the borderline of the selected speed.

Simply by moving switch 104 to the "manual" position, the signal circuit 101, 101' and the relay circuit 103, 103' may be completed across the secondary 100" of the power transformer 100 by way of line 108 and the transmitter circuit disconnected therefrom. This provides a combined manual and automatic control for emergency purposes, as when the transmitter is malfunctioning and/or is being repaired or where wind conditions require selective manual control; and it also enables installation of the control either with or without the transmitter and associated circuitry.

It will be understood that limited changes in construction and design may be adopted in order to carry out the functions of the improved control without departing from the scope of the invention as defined by the appended claims.

What is claimed and desired to be secured by United States Letters Patent is:

1. In apparatus for controlling a device as a function of prevailing wind conditions, an electric power supply circuit for said device, means for energizing and de-energizing said circuit, a rotor responsive to wind speed and a vane member movable in response to changes in the direction of the wind, a rotatable element inductively coupled to said rotor and movable to different angular positions as a function of wind speed, an electric transmitter circuit for controlling said means, first and second commutators having speed and direction contact segments connected in said transmitter circuit, segment contactors or wipers operable by said element and said vane member, said commutators and wipers being wired in series in a manner such as to effect closure of the transmitter circuit only when the wind is blowing at a velocity less than a selected value and in a given general direction, and means for manually selecting speed ranges having different upper limits.

2. Apparatus as claimed in claim 1 wherein means are provided for connecting such of the direction contact segments into the transmitter circuit as will render the device operative only when the wind is blowing in a given general direction.

3. In apparatus for controlling a device as a function of prevailing wind conditions, an electric power supply circuit for said device, means for energizing and de-energizing said circuit, a transmitter including a rotor responsive to wind speed and a vane member movable in response to changes in the direction of the wind, a rotatable element inductively coupled to said rotor and movable to different angular positions as a function of wind speed, an electric transmitter circuit for controlling said means, a speed commutator provided with contact segments wired into said transmitter circuit and having effective areas commensurate with a plurality of speed ranges having different upper limits, a contactor or wiper coacting with said commutator and operable by said element, a direction commutator having a series of contact segments corresponding to a plurality of compass points,, a contactor or wiper coacting with said direction commutator and wired in series with said speed commutator segments in a manner such as to effect closure of the transmitter circuit only when the wind is blowing at a velocity less than a selected value and in a given general direction, and means for selectively connecting into the transmitter circuit speed commutator segments having different upper limits.

4. In apparatus for controlling a device as a function of prevailing wind conditions, an electric power supply circuit for said device, means for energizing and de-energizing said circuit, a transmitter including a rotor responsive to wind speed and a vane member movable in response to changes in the direction of the wind, an electric transmitter circuit for controlling said means, means coacting with said rotor and said vane member for energizing said transmitter circuit only when the wind is blowing at a velocity less than a selected value and in a given general direction, and a switch wired into the transmitter circuit in a manner such as to enable an operator to select speed ranges having different upper limits.

5. In apparatus for controlling a device as a function of prevailing wind conditions, an electric power supply circuit for said device, means for energizing and de-energizing said circuit, a transmitter including a rotor responsive to wind speed and a vane member movable in response to changes in the direction of the wind, an electric transmitter circuit for controlling said means, means coacting with said rotor and said vane member for energizing said transmitter circuit only when the wind is blowing at a velocity less than a selected value and in a given general direction, means for delaying energization of said power circuit following energization of said transmitter circuit and means whereby an operator may select different upper limits of wind velocity.

6. In apparatus for controlling a device as a function of prevailing wind conditions, an electric power supply circuit for said device, electric control means for energizing and deenergizing said circuit, a transmitter including a rotor responsive to wind speed and a vane member movable in response to changes in the direction of the wind, a rotatable element inductively coupled to said rotor and movable to different angular positions as a function of wind speed, an electric transmitter circuit for controlling said means, a speed commutator and a direction commutator having contact segments wired in the transmitter circuit, the speed commutator having a plurality of separate contact segments arranged in sequence with each segment constituting the upper limit of a given speed range, movable contactors or wipers driven by said element and vane member, the speed commutator segment which represents the lowest speed range being electrically connected in series with the wiper of the direction commutator and the segments of said latter commutator being selectively connectable to said electric control means for the power supply circuit, a speed range selector switch wired to said low speed range segment, the remaining contact segments of said speed commutator being electrically connected to separate contact terminals of said switch.

References Cited in the file of this patent

UNITED STATES PATENTS

| | | |
|---|---|---|
| 2,067,413 | Plaisted | Jan. 12, 1937 |
| 2,191,955 | Chappell | Feb. 27, 1940 |
| 2,350,594 | Dallas | June 6, 1944 |
| 2,619,527 | Gray | Nov. 25, 1952 |